United States Patent
Fuhrmann et al.

(10) Patent No.: US 12,120,117 B2
(45) Date of Patent: *Oct. 15, 2024

(54) METHOD AND SYSTEM FOR TOKEN PROVISIONING AND PROCESSING

(71) Applicant: Visa International Service Association, San Francisco, CA (US)

(72) Inventors: Katharina Fuhrmann, Frankfurt (DE); Stephanie Zachariae, Frankfurt (DE); David Petch, London (GB); Andrew Whitcombe, Guilford (GB); David William Wilson, Camberley (GB); Neil Hilton, London (GB); Ramesh Shankar, San Mateo, CA (US); Sayeed Mohammed, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,829

(22) Filed: Aug. 29, 2023

(65) Prior Publication Data

US 2023/0403277 A1 Dec. 14, 2023

Related U.S. Application Data

(63) Continuation of application No. 17/269,935, filed as application No. PCT/US2019/047712 on Aug. 22, 2019, now Pat. No. 11,777,934.

(Continued)

(51) Int. Cl.
*H04L 9/40* (2022.01)

(52) U.S. Cl.
CPC .............. *H04L 63/0884* (2013.01)

(58) Field of Classification Search
CPC ............ H04L 63/0884; H04L 2209/56; H04L 9/3213; H04L 63/0807; G06Q 20/3821; G06Q 20/385; G06Q 20/40; G06F 21/33
See application file for complete search history.

(56) References Cited

U.S. PATENT DOCUMENTS

| | | | |
|---|---|---|---|
| 5,280,527 A | 1/1994 | Gullman et al. | |
| 5,613,012 A | 3/1997 | Hoffman et al. | |

(Continued)

FOREIGN PATENT DOCUMENTS

WO 2017176279 A1 10/2017

OTHER PUBLICATIONS

U.S. Appl. No. 17/269,935, "Notice of Allowance", May 31, 2023, 9 pages.

(Continued)

*Primary Examiner* — Huan V Doan
(74) *Attorney, Agent, or Firm* — Kilpatrick Townsend & Stockton LLP

(57) ABSTRACT

A method and system for provisioning credentials is disclosed. The method includes receiving, by a token provider computer, a token request message from a token requestor computer that comprises an initial access identifier. The token provider computer transmits the initial access identifier to a first authorization computer, and then the token provider computer receives an intermediate access identifier. The token provider computer then transmits a token activation request message to a second authorization computer based at least in part on the intermediate access identifier. The token provider computer then receives a token activation response message from the second authorization computer. The token provider computer then provides the token to the token requestor computer.

20 Claims, 9 Drawing Sheets

Related U.S. Application Data

(60) Provisional application No. 62/721,128, filed on Aug. 22, 2018.

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |

(56) References Cited

U.S. PATENT DOCUMENTS

| | | |
|---|---|---|
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,751,642 B2 | 6/2014 | Vargas et al. |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko et al. |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2003/0216998 A1 | 11/2003 | Chang et al. |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Il et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |

(56) References Cited

U.S. PATENT DOCUMENTS

| | | |
|---|---|---|
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226802 A1 | 8/2013 | Hammad et al. |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |

(56) References Cited

U.S. PATENT DOCUMENTS

| | | |
|---|---|---|
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0242853 A1 | 8/2015 | Powell |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint |
| 2016/0086184 A1 | 3/2016 | Carpenter et al. |
| 2016/0092696 A1 | 3/2016 | Guglani |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1* | 8/2016 | Patterson ............. G06Q 20/405 |
| 2016/0239842 A1 | 8/2016 | Cash et al. |
| 2016/0260097 A1 | 9/2016 | Nadella et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi et al. |
| 2017/0148013 A1 | 5/2017 | Rajurkar et al. |
| 2017/0163617 A1 | 6/2017 | Laxminarayanan et al. |
| 2017/0163629 A1 | 6/2017 | Law et al. |
| 2017/0186001 A1 | 6/2017 | Reed et al. |
| 2017/0200156 A1 | 7/2017 | Karpenko et al. |
| 2017/0200165 A1 | 7/2017 | Laxminarayanan et al. |
| 2017/0201520 A1 | 7/2017 | Chandoor et al. |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor et al. |
| 2017/0228728 A1 | 8/2017 | Sullivan |
| 2017/0236113 A1 | 8/2017 | Chitalia et al. |
| 2017/0293914 A1 | 10/2017 | Girish et al. |
| 2017/0295155 A1 | 10/2017 | Wong |
| 2017/0337549 A1 | 11/2017 | Wong |
| 2017/0352026 A1 | 12/2017 | Musil et al. |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268399 A1 | 9/2018 | Spector et al. |
| 2018/0268405 A1 | 9/2018 | Lopez |
| 2018/0285875 A1 | 10/2018 | Law et al. |
| 2018/0324184 A1 | 11/2018 | Kaja et al. |
| 2018/0324584 A1 | 11/2018 | Lopez |
| 2019/0020478 A1* | 1/2019 | Girish ................. H04L 9/3271 |
| 2019/0066069 A1 | 2/2019 | Faith et al. |
| 2019/0147439 A1 | 5/2019 | Wang et al. |
| 2019/0356489 A1 | 11/2019 | Palanisamy |
| 2019/0384896 A1 | 12/2019 | Jones |
| 2019/0392431 A1 | 12/2019 | Chitalia et al. |
| 2020/0267153 A1 | 8/2020 | Kang et al. |
| 2020/0314644 A1 | 10/2020 | Dean et al. |

OTHER PUBLICATIONS

EP19852298.9, "Extended European Search Report", Sep. 10, 2021, 12 pages.
EP19852298.9, "Office Action", Feb. 8, 2023, 8 pages.
PCT/US2019/047712, "International Preliminary Report on Patentability", Mar. 4, 2021, 10 pages.

(56) References Cited

OTHER PUBLICATIONS

PCT/US2019/047712, "International Search Report and Written Opinion", Dec. 11, 2019, 13 pages.
SG11202101587S, "Written Opinion", Nov. 14, 2022, 8 pages.

\* cited by examiner

METHOD AND SYSTEM FOR TOKEN PROVISIONING AND PROCESSING

CROSS-REFERENCE TO RELATED APPLICATIONS

This application is a continuation of U.S. patent application Ser. No. 17/269,935, filed on Feb. 19, 2021, which is a National Stage of international application claims priority to U.S. Patent Application No. 62/721,128, filed on Aug. 22, 2018, the disclosure of which are herein incorporated by reference in their entirety for all purposes.

BACKGROUND

Entities often maintain accounts for users, whereby users may access a resource utilizing an associated account with the entity (e.g., a bank, a government organization, cloud services provider, etc.). In a banking example, the bank may function as an account issuer and issue a payment card (e.g., a debit card) to the user which allows the user to utilize payment credentials (e.g., primary account number (PAN), CVV2, etc.) associated with the account to obtain a good. In some cases, the user may use the payment card for cross-border transactions. For example, the user may obtain the card from a bank in their residence country (e.g., Canada) and then travel to another country (e.g., the United States (U.S.)) to execute a payment transaction.

Also, modern systems have been created to provision a communication device (e.g., a mobile phone) with access data (e.g., a token) that is associated with a user account to be later used in conducting a transaction. For example, continuing with the banking example, the mobile phone may be provisioned with access data associated with the user's bank account (e.g., a PAN, a payment token, etc.) which may allow the mobile phone to access the account to obtain a good. Once the mobile phone is provisioned with the access data, the user may, for example, use the mobile phone to conduct e-commerce transactions utilizing the payment account. In another example, the user may go to a merchant store and tap the mobile phone on an access device (e.g., a Point-of-Sale (POS) terminal) to conduct the transaction. In a non-banking example, a cloud services provider entity may issue credentials for a particular user that allow the user to access a file associated with their account on a remote file share in the cloud. The cloud services provider may provision the user's mobile phone with access data (e.g., a token) corresponding to the user credentials with the cloud services provider, which enables the mobile phone to access the file on the remote file share in the cloud via the mobile phone.

However, transactions may often involve multiple entities that process transaction related data at various stages of the transaction processing pipeline. In these cases, interoperability between entities in the transaction pipeline is a significant challenge. For example, a bank in a particular country may issue a payment card that corresponds to a user account information (e.g., account number) that is formatted according to banking standards in that particular country. However, merchant stores and/or websites in another country may have an existing infrastructure (e.g., POS terminals, web servers) configured to conduct transactions with account numbers in a different format, which may present obstacles to conducting the transaction. In another example, software applications (e.g., a digital wallet) on the user's mobile phone may be configured to facilitate provisioning the mobile phone with access data based on receiving a user account number in a particular format, which may differ from the format of the account credentials issued by the issuer.

Embodiments of the invention are directed to methods and systems of improving interoperability between issuers and other entities involved in a transaction. Embodiments of the invention address these and other problems, individually and collectively.

SUMMARY

Embodiments of the invention are directed to secure token processing systems and methods.

One embodiment of the invention is directed to a method comprising: receiving, by a token provider computer, a token request message from a token requestor computer, the token request message comprising an initial access identifier; transmitting, by the token provider computer, the initial access identifier to a first authorization computer; receiving, by the token provider computer, an intermediate access identifier; transmitting, by the token provider computer and based at least in part on the intermediate access identifier, a token activation request message to a second authorization computer; receiving, by the token provider computer from the second authorization computer, a token activation response message from the second authorization computer; and providing, by the token provider computer, a token to the token requestor.

Another embodiment of the invention can be directed to a token provider computer configured to perform the above described method.

Another embodiment of the invention is directed to a method comprising: receiving, by a first authorization computer, an initial access identifier from a token provider computer. The method then includes obtaining, by the first authorization computer, an intermediate access identifier based at least in part on the initial access identifier; and transmitting, by the first authorization computer, the intermediate access identifier to the token provider computer, wherein the token provider computer transmits, based at least in part on the intermediate access identifier, a token activation request message to a second authorization computer to authorize a token to be provisioned to a token requestor computer.

Another embodiment of the invention can be directed to a first authorization computer configured to perform the above described method.

Another embodiment of the invention is directed to a method comprising: receiving, by a processing computer, an authorization request message comprising a token; providing, by the processing computer, the token to a token provider computer in a transaction; receiving, by the processing computer, an intermediate access identifier associated with the token; modifying, by the processing computer, the authorization request message to include the intermediate access identifier; and transmitting, by the processing computer, the authorization request message including the intermediate access identifier to a first authorization computer, wherein the first authorization computer modifies the authorization request message to include an initial access identifier associated with the intermediate access identifier, and transmits the authorization request message with the initial access identifier to a second authorization computer to authorize the transaction.

Other embodiments of the invention can be directed to a processing computer configured to perform the above-noted method.

These and other embodiments of the invention are described in further detail below, with reference to the Figures and Detailed Description.

DETAILED DESCRIPTION

Figure 1:
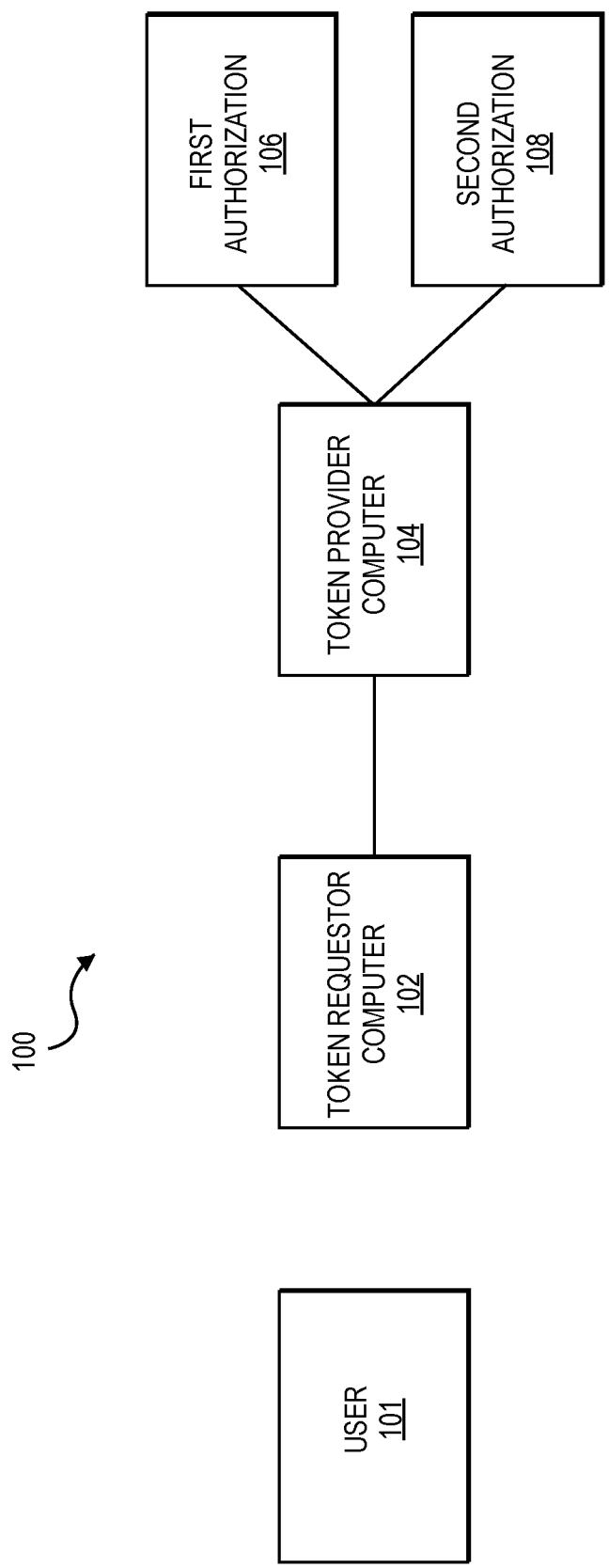
FIG. 1 shows a block diagram of a system according to an embodiment of the invention.

Embodiments of the invention provide for mechanisms for facilitating secure token provisioning to a token requestor computer (e.g., a communication device such as a mobile phone) for later use in a transaction. In one embodiment, a high-level provisioning process flow may proceed as follows. First, the token requestor computer may initiate a provisioning process by transmitting an initial access identifier (e.g., an International Bank Account Number (IBAN) obtained from the issuer bank) and a user identifier (e.g., user name, email address, etc.) to a token provider computer. Second, the token provider computer subsequently interacts with a first authorization computer (e.g., an intermediary that is a trusted third-party proxy for the issuer) to obtain an intermediate access identifier (e.g., a virtual PAN) based on the initial access identifier and the user identifier. The first authorization computer may store a mapping between the initial access identifier and the intermediate access identifier for future use in processing a transaction. Third, based on receiving the intermediate access identifier from the first authorization computer, the token provider computer interacts with a second authorization computer (e.g., the issuer) to obtain a token activation approval. Fourth, the token provider computer then provides the activated token to the token requestor computer, which may be stored for future use. The token provider computer may store a mapping between the intermediate access identifier and the token for future use in processing a transaction.

In some embodiments, a token may be "push" provisioned to a token requestor computer via an issuer application (e.g., bank application) that initiates a provisioning request by "pushing" a payload including user credentials to an application executing on the token requestor computer (e.g., a digital wallet). In this case, the user may simply use the issuer application to select a digital wallet to be provisioned with a token, and no manual entry of credentials by the user is required. The token requestor computer may then initiate a provisioning process with a token provider computer as described above.

In other embodiments, a token may be "manually" provisioned to a token requestor computer, whereby the token requestor application executing on the token requestor computer directly receives input from a user (e.g., via keyboard entry), for example, including a user identifier and an initial access identifier. The token requestor computer may then initiate a provisioning process with a token provider computer as described above.

In some embodiments, after the token requestor computer has been provisioned with a token, the token requestor computer may use the token to conduct a transaction. In one embodiment, and using a payment transaction as a non-limiting example, a high-level transaction process flow may proceed as follows. First, a communication device (e.g., which may be the same token requestor computer that was previously provisioned with a token) may interact with an access device (e.g., tapping the phone against a merchant POS terminal) by transmitting the provisioned token to the access device. Second, the access device may transmit an authorization request message including the token to a transport computer (e.g., an acquirer computer affiliated with the merchant access device). Third, the transport computer may transmit the authorization request message including the token to a processing computer (e.g., a server computer within a payment processing network such as VisaNet™). Fourth, the processing computer may then use the token to retrieve the intermediate access identifier (e.g., utilizing the mapping previously stored by the token provider computer during the provisioning process). The processing computer may then modify the authorization request message to include the intermediate access identifier. Fifth, the processing computer may transmit the modified authorization request message to the first authorization computer. Sixth, the first authorization computer may use the intermediate access identifier to retrieve the initial access identifier (e.g., utilizing the mapping previously stored by the first authorization computer during provisioning). The first authorization computer may then modify the authorization request message to include the initial access identifier. Seventh, the first authorization computer may send the modified authorization request message to the second authorization computer. Eighth, the second authorization computer may approve the transaction based at least in part on receiving the initial access identifier from the first authorization computer.

Embodiments of the invention provide for a number of technical advantages. In one non-limiting example, some initial access identifiers, such as IBANs, may be incompatible with existing token provisioning systems (e.g., which may require a PAN format). Accordingly, using conventional techniques, a user may be unable to provision their communication device (e.g., mobile phone) with a payment token based on the issued IBAN. In contrast, embodiments of the present invention utilize an intermediate access identifier to provide interoperability between issuers and other entities (e.g., a token provider service) within existing token provisioning systems. In this way, a user could provision their mobile phone with a payment token using an IBAN. Thus, for example, the user may be able to tap their token-provisioned mobile phone against a merchant access device to conduct a transaction. Additionally, the user may travel to another country (e.g., with different payment processing systems) and still be able to tap their token-provisioned mobile phone against a merchant access device to conduct a transaction. In yet another example, the user could conduct remote e-commerce transactions using a digital wallet on their mobile phone based on the token associated with the otherwise incompatible IBAN. Embodiments of the invention also provide for greater data security during the authorization process. For example, even if an intermediate access identifier may be compromised in a man-in-the-middle attack, in some embodiments, it will be of little value as it may not be used to conduct transactions.

It should be understood that the technical advantages of the present invention are not only applicable to payment-based token provisioning systems. In another non-limiting example, a cloud services provider may issue credentials used to access files whereby the credentials may have a particular format according to the particular geographical region and/or organization associated with the user. A token provisioning system may be configured to only provision tokens for accessing files upon receiving credentials in a different format. Similar to as described above, embodiments of the present invention may utilize an intermediate access identifier to provide interoperability between cloud services provider issuer and the token provisioning system, such that, for example, a user with issued credentials in an otherwise incompatible format may nevertheless be able to provision their communication device with a token so they may access files in the cloud. This also may reduce the number of infrastructure updates required by a particular issuer (e.g., bank, cloud services provider, etc.) to be interoperable with multiple token provisioning systems, and thus enable more efficient token provisioning to a wider variety of users.

Before discussing embodiments of the invention, some descriptions of some terms may be useful.

A "communication device" may comprise any suitable electronic device that may be operated by a user, which may also provide remote communication capabilities to a network. For example, a communication device may be a personal computer (PC). A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device (e.g., an identifier for a payment account). A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

An "application" may be a computer program that is used for a specific purpose. Examples of applications may include a banking application, digital wallet application, cloud services application, ticketing application, etc.

A "digital wallet" can include an electronic device and/or application that allows an individual to conduct electronic commerce transactions. A digital wallet may store user profile information, payment credentials, bank account information, access data, tokens, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, accessing secure data, and/or the like. A digital wallet may be designed to streamline the purchase and payment process. A digital wallet may allow the user to load one or more payment cards onto the digital wallet so as to make a payment without having to enter an account number or present a physical card.

"Access data" may include any suitable data that can be used to access a resource or create data that can access a resource. In some embodiments, access data may be account information for a payment account. Account information may include a PAN, IBAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "initial access identifier" may include an identifier originally used by a user. The initial access identifier may be an original credential that is issued by an issuer. The initial access identifier may be in any suitable format, such as alphanumeric characters, alphabetic characters, numeric, text based, etc. In some cases, the initial access identifier may be associated with an account for a single user. In other cases, the initial access identifier may be associated with multiple users, for example, who may share an account. Examples of an initial access identifier may include an original primary account number, or IBAN identifier. An IBAN identifier (also known as an "IBAN") may include alphanumeric characters, instead of just numbers. Other examples may include a cloud services account number, mass transit account number, a building access identifier, etc. An initial access identifier may also include a combination of fields, for example, including an IBAN identifier and an email address or other user identifier.

An "intermediate access identifier" may include an identifier that can be used as an intermediary in a process. The intermediate access identifier may be in any suitable format, such as alphanumeric characters, alphabetic characters, numeric, text based, etc. In some cases, the intermediate access identifier may be associated with a single user or with multiple users, for example, who may share an account. Also, in some cases, the intermediate access identifier may be capable of being used to conduct a transaction. In other cases, the intermediate access identifier may be incapable of being used to conduct a transaction. For example, an intermediate access identifier may include a virtual PAN that is mapped to an IBAN initial access identifier. The virtual PAN may subsequently be mapped to a token. In some cases, the intermediate access identifier is 16, 18, or 19 digits long and may resemble a real PAN (primary account number), but may not be used to conduct a transaction.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a PAN or IBAN. For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," "token provider," or "token service system" can include a system that services tokens. In some embodiments, a token service system can facilitate requesting, determining (e.g., generating) and/or issuing tokens, as well as maintaining an established mapping of tokens to credentials (e.g., primary account numbers (PANs)) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual credentials (e.g., PANs). In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e., token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token request message" may be an electronic message for requesting a token. A token request message may include information usable for identifying an account (e.g., payment account) or digital wallet, and/or information for generating a token. For example, a token request message may include payment credentials, mobile device identification information (e.g. a phone number or MSISDN), a digital wallet identifier, information identifying a tokenization service provider, a merchant identifier, an account access identifier, a user identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "user identifier" may include any characters, numerals, or other identifiers associated with a user associated with a network token system. For example, a user identifier may be associated with an entity that is registered with the network token system. For example, in one embodiment, the user identifier may be a customer ID or email address associated with an authorized user of a bank account that is maintained by a bank.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank, cloud services provider) that maintains an account for a user. An issuer may also issue credentials (e.g., payment credentials) stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), server computers, tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user identifier, an initial access identifier, an intermediate access identifier, an expiration date, etc. An authorization request message may also comprise "transaction information," such as any information associated with a current transaction, such as, in the case of a payment transaction, the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. The authorization response message may also comprise additional data elements corresponding to "identification information" similar to as described above, which may be used to route the message to back to the requestor.

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "identification and verification (ID&V) method" may be used to ensure that the payment token is replacing a PAN that was legitimately being used by the token requestor. Examples of ID&V methods may include, but are not limited to, an account verification message, a risk score based on assessment of the primary account number (PAN) and use of one time password by the issuer or its agent to verify the account holder. Exemplary ID&V methods may be performed using information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc. Using the ID&V, a confidence level may be established with respect to the token to PAN binding.

A "token assurance level" may refer to an indicator or a value that allows the token service provider to indicate the confidence level of the token to PAN binding. The token assurance level may be determined by the token service provider based on the type of identification and verification (ID&V) performed and the entity that performed the ID&V. The token assurance level may be set when issuing the token. The token assurance level may be updated if additional ID&V is performed.

A "requested token assurance level" may refer to the token assurance level requested from the token service provider by the token requestor. The requested token assurance level may be included in a field of a token request message send by the requestor to the token service provider for the generation/issuance of the token.

An "assigned token assurance level" may refer to the actual (i.e., generated) value assigned by the token service provider to the token as the result of the identification and verification (ID&V) process performed by an entity within the tokenization ecosystem. The assigned token assurance level may be provided back to the token requestor in response to the token request message. The assigned token assurance level may be different than the requested token assurance level included in the token request message.

"Token attributes" may include any feature or information about a token. For example, token attributes may include information that can determine how a token can be used, delivered, issued, or otherwise how data may be manipulated within a transaction system. For example, the token attributes may include a type of token, frequency of use, token expiry date and/or expiry time, a number of associated tokens, a transaction lifecycle expiry date, and any additional information that may be relevant to any entity within a tokenization ecosystem. For example, token attributes may include a wallet identifier associated with the token, an additional account alias or other user account identifier (e.g., an email address, username, etc.), a device identifier, an invoice number, etc. In some embodiments, a token requestor may provide token attributes at the time of requesting the generation of tokens. In some embodiments, a network token system, payment network associated with the network token system, an issuer, or any other entity associated with the token may determine and/or provide the token attributes associated with a particular token.

The token attributes may identify a type of token indicating how the token may be used. A payment token may include a high value token that can be used in place of a real account identifier (e.g., PAN) to generate original and/or subsequent transactions for a consumer account and/or card. Another token type may be a "static" or "dynamic" token type for static and dynamic tokens, respectively.

A "token requestor" may refer to an entity that is seeking to implement tokenization according to embodiments of the present invention. In some embodiments, the token requestor may initiate a request that a primary account number (PAN) or an initial access identifier be tokenized by submitting a token request message to the token service provider. According to various embodiments discussed herein, a token requestor may no longer need to store a PAN associated with a token once the requestor has received the token in response to a token request message. The requestor may be an application, a device, a process, or a system that is configured to perform actions associated with tokens. For example, a requestor can request registration with a network token system, request token generation, token activation, token de-activation, token exchange, other token lifecycle management related processes, and/or any other token related processes. A requestor may interface with a network token system through any suitable communication networks and/or protocols (e.g., using HTTPS, SOAP and/or an XML interface among others). Some non-limiting examples of token requestors may include, for example, a communication device of an authorized account holder, card-on-file merchants, acquirers, acquirer processors, and payment gateways acting on behalf of merchants, payment enablers (e.g., original equipment manufacturers, mobile network operators, etc.), digital wallet providers, issuers, third party wallet providers, and/or payment processing networks. In some embodiments, a token requestor can request tokens for multiple domains and/or channels. A token requestor may be registered and identified uniquely by the token service provider within the tokenization ecosystem. During token requestor registration, the token service provider may formally process token requestor's application to participate in the token service system. The token service provider may collect information pertaining to the nature of the requestor and relevant use of tokens to validate and formally approve the token requestor and establish appropriate domain restriction controls. Successfully registered token requestors may be assigned a token requestor identifier that may also be entered and maintained within the token vault. Token requestors may be revoked or assigned new token requestor identifiers. This information may be subject to reporting and audit by the token service provider.

A "token request indicator" may refer to an indicator used to indicate that the message containing the indicator is related to a token request. The token request indicator may optionally be passed to the issuer as part of the Identification and Verification (ID&V) method to inform the issuer of the reason the account status check is being performed.

A "payment network" may refer to an electronic payment system used to accept, transmit, or process transactions made by payment devices for money, goods, or services. The payment network may transfer information and funds among issuers, acquirers, merchants, and payment device users.

FIG. 1 shows a block diagram of a system 100 for provisioning a token, according to an embodiment of the invention. The system 100 comprises a token requestor computer 102 which may be associated with a user 101, a token provider computer 104, a first authorization computer 106, and a second authorization computer 108.

The token requestor computer 102, the token provider 104 computer, the first authorization computer 106, and the second authorization computer 108 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The token requestor computer 102 may be configured to receive input from the user 101 that instructs the token requestor computer 102 to initiate a token provisioning process with the token provider computer 104 to provision a token. In some embodiments, the token requestor computer 102 may be a communication device (e.g., a mobile phone, PC, etc.) of the user 101, which receives instructions from the user 101 to provision a communication device with a token. In some embodiments, and as described in embodiments below, the token requestor computer 102 and the communication device to be provisioned may be the same device. However, it should be understood that in other embodiments, they may be different devices. For example, the token requestor computer 102 may request a token on behalf of another communication device, and then, once the token is received, transmit the token to the other communication device to be stored.

In some embodiments, the token requestor computer 102 may execute a token requestor application, for example, a digital wallet, which may be responsible for requesting, storing, and/or managing one or more tokens received by the token provider computer 104. In some embodiments, the token requestor computer 102 may also execute an issuer application such as a mobile banking application, a cloud services application, a mass transit account application, etc. The issuer application may be responsible for sending a token request message to the token requestor application to initiate a provisioning process with the token provider computer 104. However, in other embodiments, the token requestor computer 102 may not include an issuer application.

The token provider computer 104 may be a computer affiliated with a token provider. The token provider computer 104 may facilitate requesting, determining (e.g., generating) and/or issuing tokens. For example, the token provider computer 104 may receive a token request message from the token requestor computer 102, and in turn facilitate a sequence of message exchanges with the first authorization computer 106 and the second authorization computer 108, after which the token provider computer 104 provides the activated token to the token requestor computer 102. In some embodiments, the token provider computer 104 may also maintain a mapping of tokens to identifiers in a repository (e.g., a token vault). For example, the token provider computer 104 may maintain a mapping from tokens to intermediate access identifiers, initial access identifiers, etc. The token provider computer 104 may include or be in communication with a token vault where the generated tokens are stored. The token provider computer 104 may support token processing of transactions submitted using tokens by de-tokenizing the token to obtain an associated identifier (e.g., an intermediate access identifier) and then transmitting the associated identifier to the first authorization computer 106 for further processing.

The first authorization computer 106 may be a server computer that functions as an intermediary between the token provider computer 104 and the second authorization computer 108. In some embodiments, the first authorization computer 106 may be affiliated with a third-party entity (e.g., issuer processor) that functions as a trusted proxy for the issuer entity (e.g., a bank). In other embodiments, the first authorization computer 106 may be directly affiliated with the issuer entity. In some embodiments, the first authorization computer 106 and the token provider computer 104 are both operated by the token provider, and/or the functions of each may be performed by the same server computer. During the token provisioning process, the first authorization computer 106 may be responsible for obtaining (e.g., generating) an intermediate access identifier from the initial access identifier and maintaining a mapping between the initial access identifier and the intermediate access identifier. During the transaction processing phase, the first authorization computer 106 may receive the intermediate access identifier from the token provider computer 104, use the mapping to retrieve the initial access identifier, and then transmit the initial access identifier to the second authorization computer 108 for transaction authorization.

The second authorization computer 108 may be a server computer that is affiliated with the issuer. During the token provisioning phase, the second authorization computer 108 may be responsible for approving or else denying a token activation request that is received from the token provider computer 104 on behalf of the token requestor computer 102. During the transaction processing phase, the second authorization computer 108 may be responsible for authorizing or denying an authorization request received from the token provider computer 104 on behalf of the token requestor computer 102.

Figure 2:
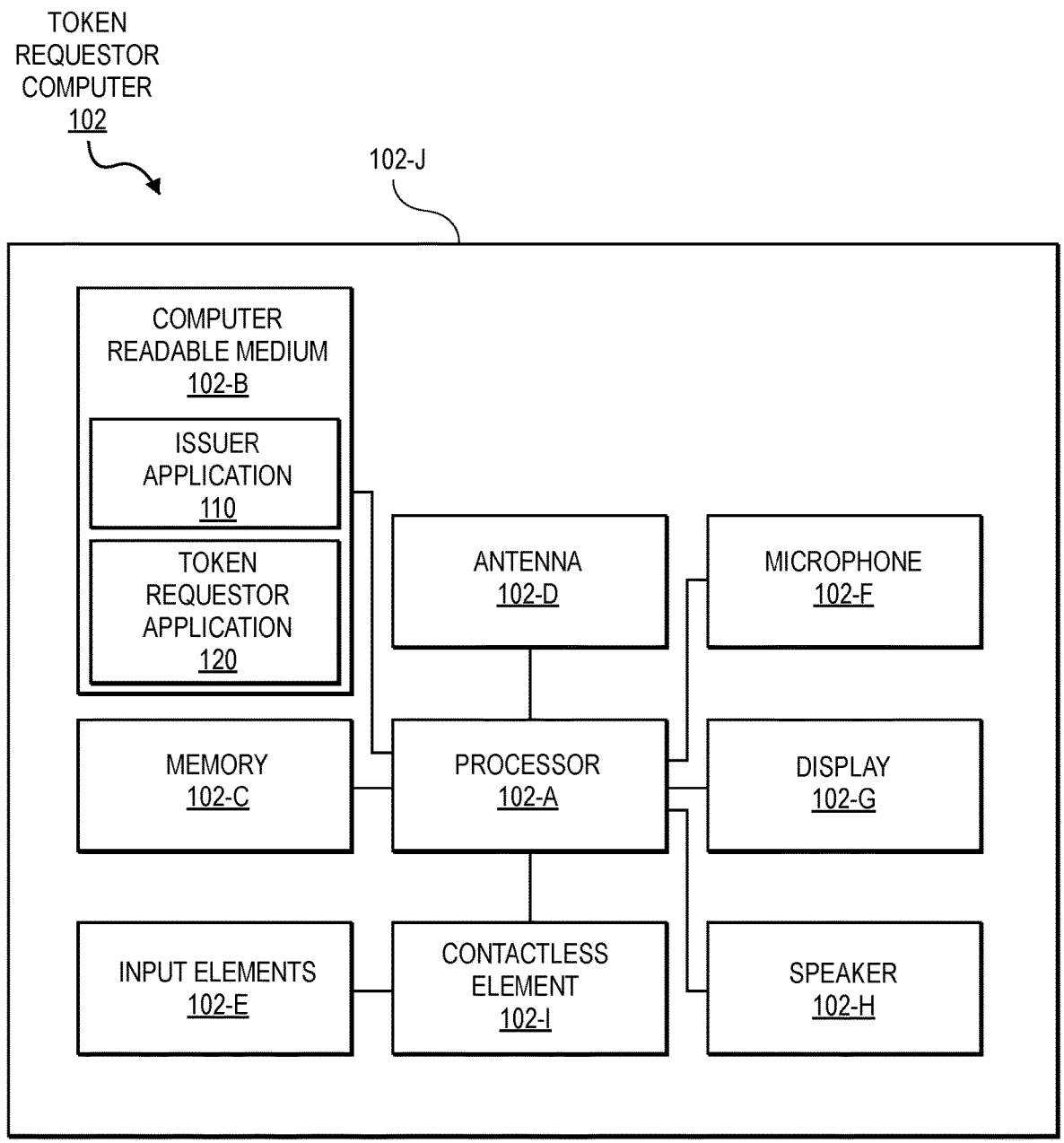
FIG. 2 shows a block diagram of a token requestor computer of the system according to an embodiment of the invention.

FIG. 2 shows a block diagram of a token requestor computer 102 of the system according to an embodiment of the invention. In some embodiments, the token requestor computer 102 may be a communication device (e.g., a mobile phone) that can be used to make payments or a device which can allow a user to gain access to a location. The exemplary token requestor computer 102 may comprise a computer readable medium 102-B and a memory 102-C that can be present within the body 102-J of the token requestor computer 102. The body 102-J may be in the form a plastic substrate, housing, or other structure. In some cases, the memory 102-C may be a secure element, and/or may also store information such as access data such as tokens, PANs, tickets, etc. Information in the memory 102-C may be transmitted by the token requestor computer 102 to another device using an antenna 102-D or contactless element 102-I.

The computer readable medium 102-B may comprises code, executable by the processor for implementing methods according to embodiments. The computer readable medium 102-B may contain an issuer application 110 and a token requestor application 120. The issuer application 110 can be used to "push" provision the token requestor computer 102 with a token by transmitting a token request message to the token requestor application 120. The issuer application also can provide functions provided by an issuer and may allow the token requestor computer 120 to communicate with an issuer computer (e.g., the second authorization computer 108). Examples of issuer applications can include banking applications, payment applications, merchant applications, transit applications, applications to access secure data, etc. The token requestor application 120 can allow the token requestor computer 102 to communicate with a token provider computer 104. Examples of token requestor applications can include various types of digital wallet applications (e.g., used for money transfer/personal payments, mobile commerce, accessing secure data, etc.). The token requestor application 120 may be used to facilitate the enrollment process to provision a token onto the token requestor computer 102. It may also subsequently be used to conduct a transaction with a token without requiring a user 101 to enter an account number or present a physical card.

In some embodiments, the token requestor computer 102 may further include a contactless element 102-I, which is typically implemented in the form of a semiconductor chip (or other data storage element) with an associated wireless transfer (e.g., data transmission) element, such as an antenna. Data or control instructions that are transmitted via a cellular network may be applied to the contactless element 102-I by means of a contactless element interface (not shown). Contactless element 102-I may be capable of transferring and receiving data using a short range wireless communication capability. Thus, the token requestor computer 102 may be capable of communicating and transferring data or control instructions via both cellular network (or any other suitable wireless network—e.g. the Internet or other data network) and short range communications.

The token requestor computer 102 may also include a processor 102-A (e.g., a microprocessor) for processing the functions of the token requestor computer 102 and a display 102-G to allow a user to view information. The token requestor computer 102 may further include input elements 102-E (e.g., a touchscreen, keyboard, touchpad, sensors such as biometric sensors, etc.), a speaker 102-H, and a microphone 102-F. The token requestor computer 102 may also include an antenna 102-D for wireless data transfer.

Figure 3:
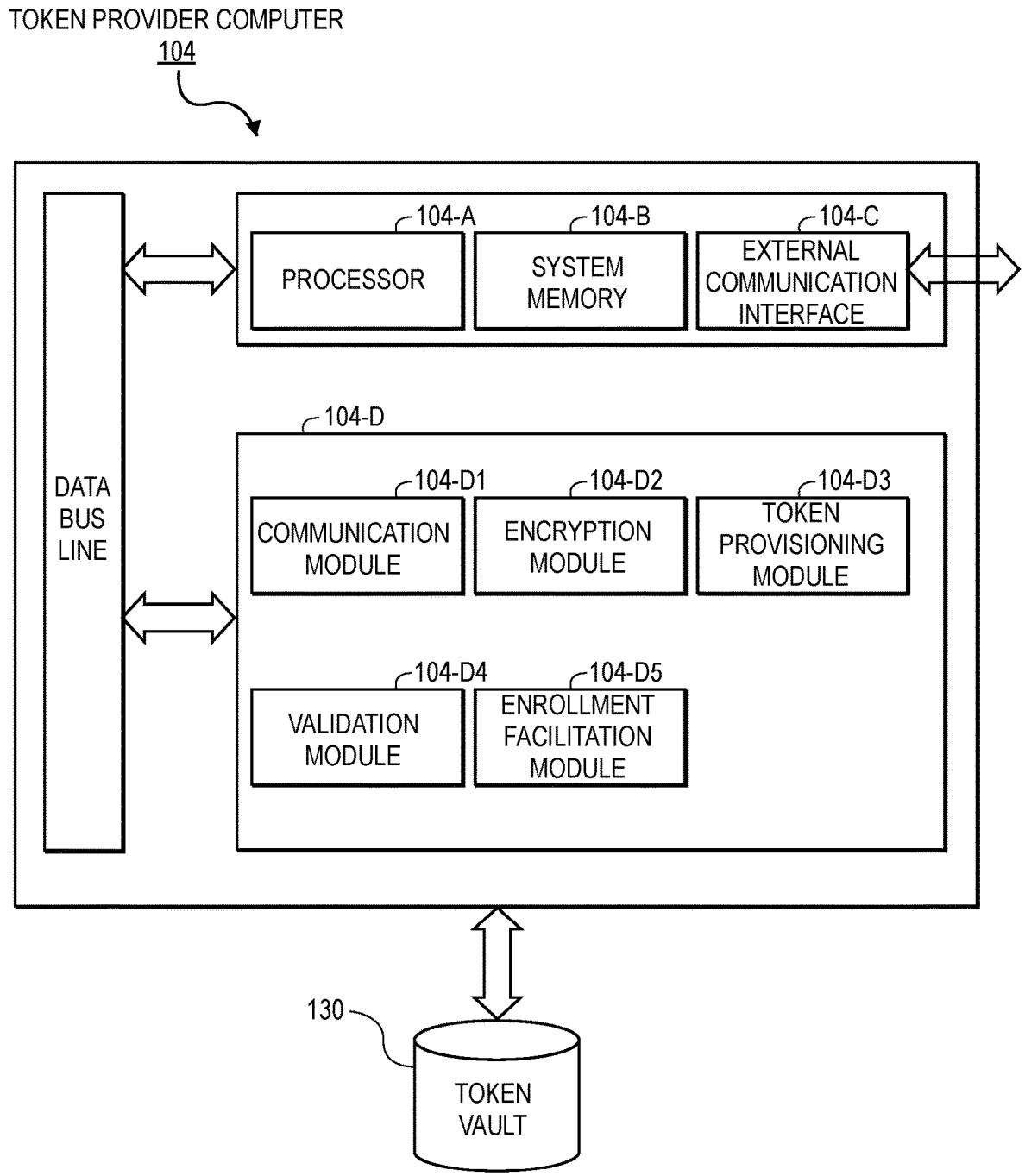
FIG. 3 shows a block diagram of a token provider computer of a system according to an embodiment of the invention.

FIG. 3 shows a block diagram of a token provider computer 104 of a system according to an embodiment of the invention. FIG. 3 shows a token provider computer 104 and a token vault 130 coupled to the token provider computer 104.

The token vault 130 may store tokens and their associated credentials in a database. The token vault 130 may store data in a token record database such as an Oracle™ database. In some embodiments, the token vault 130 may store in the database a mapping between a token and one or more associated credentials (e.g., an intermediate access identifier and/or initial access identifier).

The token provider computer 104 may comprise a processor 104-A, which may be coupled to a system memory 104-B and an external communication interface 104-C. A computer readable medium 104-D may also be operatively coupled to the processor 104-A.

The computer readable medium 104-D may comprise a number of software modules including a communication module 104-D1, an encryption module 104-D2, a token provisioning module 104-D3, a validation module 104-D4, and an enrollment facilitation module 104-D5.

The communication module 104-D1 may comprise code that causes the processor 104-A to generate messages, forward messages, reformat messages, and/or otherwise communicate with other entities.

The encryption module 104-D2 may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 104-D2 may utilize symmetric or asymmetric encryption techniques to encrypt and/or verify data.

The token provisioning module 104-D3 may comprise code that causes the processor 104-A to provide tokens. For example, the token provisioning module 104-D3 may contain logic that causes the processor 104-A to generate a payment token and/or associate the payment token with a set of payment credentials (e.g., an intermediate access identifier). A token record may then be stored in a token record database of the token vault 130 indicating that the payment token is associated with (i.e., mapped to) a certain user or a certain set of payment credentials.

The validation module 104-D4 may comprise code that causes the processor 104-A to validate token requests before a token is provided. For example, validation module 104-D4 may contain logic that causes the processor 104-A to confirm that a token request message is authentic by decrypting a cryptogram included in the message, by confirming that the payment credentials are authentic and associated with the requesting device (e.g., a token requestor computer 102), and/or by assessing risk associated with the requesting device.

The enrollment facilitation module 104-D5 may comprise code that causes the processor 104-A to transmit messages to one or more entities to facilitate a token provisioning process. For example, the enrollment facilitation module 104-D5 may contain logic that causes the processor 104-D5 to transmit a message containing an initial access identifier, received from the token requestor computer 102, to a first authorization computer 106. The enrollment facilitation module 104-D5 may also receive back from the first authorization computer 106 an intermediate access identifier. In some embodiments, the enrollment facilitation module 104-

D5 may subsequently exchange messages with the token requestor computer 102 to receive input from the user 101 to continue the enrollment process (e.g., agreeing to terms and conditions). In some embodiments, based on receiving the intermediate access identifier from the first authorization computer 106 and/or input from the user 101 indicating agreement with the terms and conditions, the enrollment facilitation module 104-D5 may subsequently send a token activation request message to the second authorization computer 108, and receive back a token activation response message indicating approval or else denial of the activation request. The enrollment facilitation module 104-D5 may then relay that indication back to the token requestor computer 102. Assuming that the second authorization computer 108 approved the activation request, the enrollment facilitation module 104-D5 may provide the token to the token requestor computer 102 and store a mapping of the token to one or more credentials (e.g., the intermediate access identifier) in the token vault 130.

Figure 4:
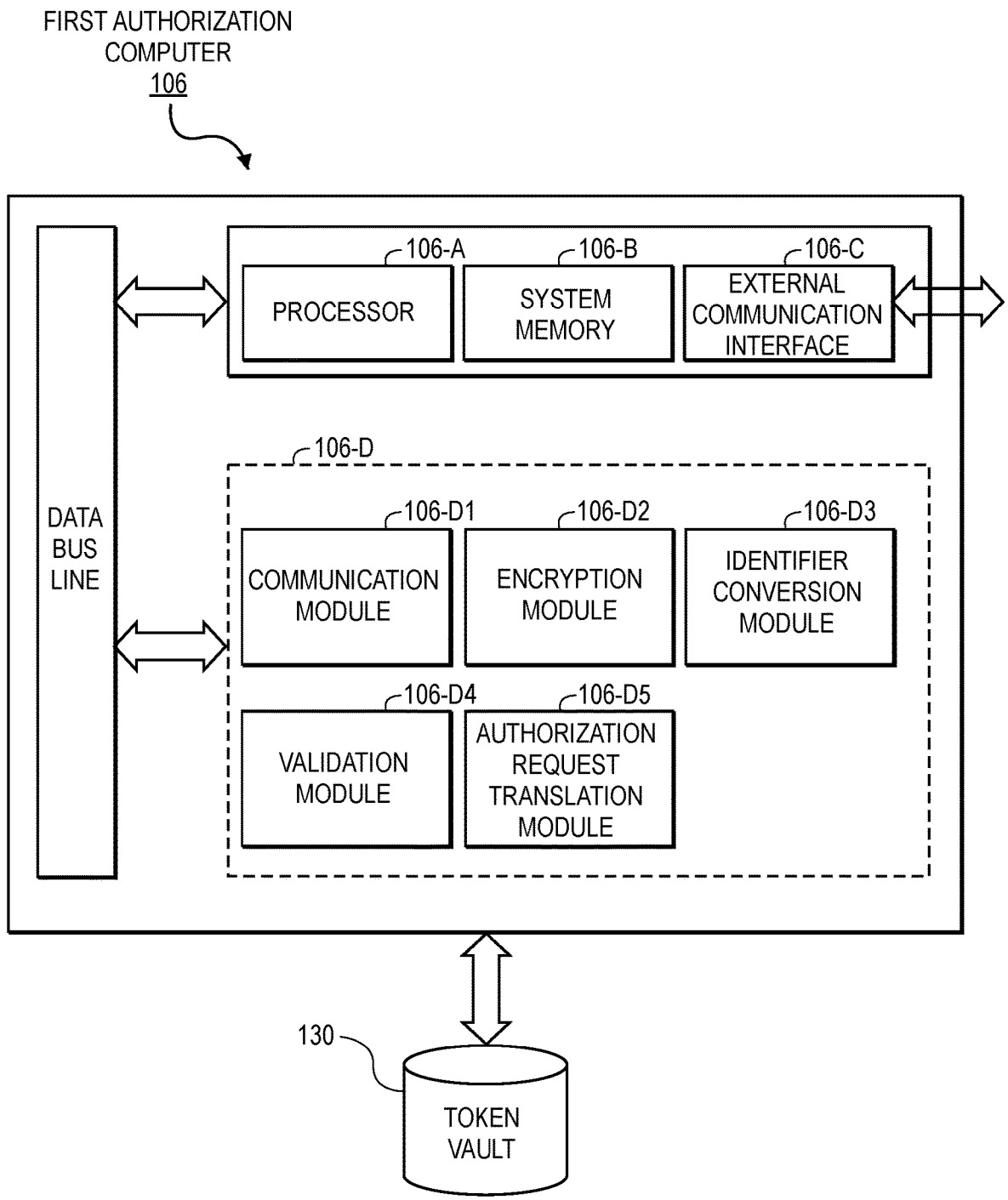
FIG. 4 shows a block diagram of a first authorization computer of a system according to an embodiment of the invention.

FIG. 4 shows a block diagram of a first authorization computer 106 of a system according to an embodiment of the invention. The first authorization computer 106 may be coupled to a records database (not shown), whereby the first authorization computer 106 stores a mapping between identifiers. For example, the database may store a mapping between an initial access identifier and an intermediate access identifier. In some embodiments, the mapping may also include other associations, for example, a mapping between the initial access identifier and a user identifier that corresponds to the user 101. In some embodiments, for example, if the first authorization computer 106 and the token provider computer 104 operate as one entity, the records database of the first authorization computer 106 and the token record database of the token vault 130 may correspond to the same database. In that case, the token vault 130 may store a mapping between the token, the initial access identifier, the intermediate access identifier, and/or the user identifier.

The first authorization computer 106 may comprise a processor 106-A, which may be coupled to a system memory 106-B and an external communication interface 106-C. A computer readable medium 106-D may also be operatively coupled to the processor 106-A.

The computer readable medium 106-D may comprise a number of software modules including a communication module 106-D1, an encryption module 106-D2, an identifier conversion module 106-D3, a validation module 106-D4, and an authorization request translation module 106-D5.

The communication module 106-D1 may comprise code that causes the processor 106-A to generate messages, forward messages, reformat messages, and/or otherwise communicate with other entities.

The encryption module 106-D2 may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 106-D2 may utilize symmetric or asymmetric encryption techniques to encrypt and/or verify data.

The identifier conversion module 106-D3 may comprise code that causes the processor 106-A to obtain (e.g., generate or retrieve from an existing pool in the records database) an intermediate access identifier based on receiving an initial access identifier. In some embodiments, for example in the case of retrieving from an existing pool, the identifier conversion module 106-D3 may maintain a record of intermediate access identifiers that are mapped to active initial access identifiers (e.g., non-expired or not deactivated) as well as non-active initial access identifiers. For example, the first authorization computer 106 may receive updates from a token provider computer 104 about what initial access identifiers are active. If, upon receiving a request for an intermediate access identifier based on receiving an initial access identifier, the identifier conversion module 106-D3 determines that an existing intermediate access identifier is currently mapped to a non-active initial access identifier, the identifier conversion module 106-D3 may provide the existing intermediate access identifier and re-map the intermediate access identifier to the initial access identifier received as input. In other embodiments, upon receiving a request, the identifier conversion module 106-D3 may generate a new intermediate access identifier and map it to the initial access identifier received as input. In some embodiments, the generated or updated intermediate access identifier and the corresponding mapping may be stored in the records database.

The validation module 106-D4 may comprise code that causes the processor 106-A to validate requests for an identifier (e.g., intermediate access identifier) before one is provided. For example, validation module 106-D4 may contain logic that causes the processor 106-A to confirm that a request message is authentic by decrypting a cryptogram included in the message, by confirming that the credentials (e.g., initial access identifier, user identifier, etc.) are authentic and associated with the requesting device (e.g., a token requestor computer 102, token provider computer 104), and/or by assessing risk associated with the requesting device. As described above, the first authorization computer 106 may be a trusted third-party proxy or otherwise associated with an issuer of the initial access identifier. Accordingly the first authorization computer 106 may also receive predefined rules from the issuer (e.g., the second authorization computer 108) corresponding to whether a particular initial access identifier qualifies to be issued an intermediate access identifier. For example, a rule may determine that only initial access identifiers (e.g., IBANs) within a certain range of values may qualify to be mapped to an intermediate access identifier (e.g., a virtual PAN).

The authorization request translation module 106-D5 may comprise code that causes the processor 106-A to retrieve one identifier based on receiving another identifier during a transaction process phase. For example, the authorization request translation module 106-D5 may receive an authorization request message containing an intermediate access identifier (e.g., previously generated during the token provisioning phase by the identifier conversion module 106-D3). Based on the intermediate access identifier, the authorization request translation module 106-D5 may retrieve the associated initial access identifier from the records database. The authorization request translation module 106-D5 may then modify the authorization request message to include the initial access identifier and then transmit the modified message to another entity (e.g., the second authorization computer 108) for transaction authorization.

It should be understood that, as described herein, the mappings stored may be bidirectional. For example, a mapping between a token and an initial access identifier that is stored in the token vault 130 may be operable such that an initial access identifier may be used to retrieve a token, and vice versa. In another example, a mapping between an initial access identifier and an intermediate access identifier may be operable that an intermediate access identifier may be used to retrieve an initial access identifier, and vice versa. Accordingly, for example, if the first authorization computer 106 receives an authorization response message from the second authorization computer 108 that contains the initial access identifier, the first authorization computer 106 may use the initial access identifier to retrieve the associated intermediate access identifier and transmit it to another entity (e.g., a transaction processing computer) for further processing. In this way, messages may be correctly routed in both directions.

Figure 5:
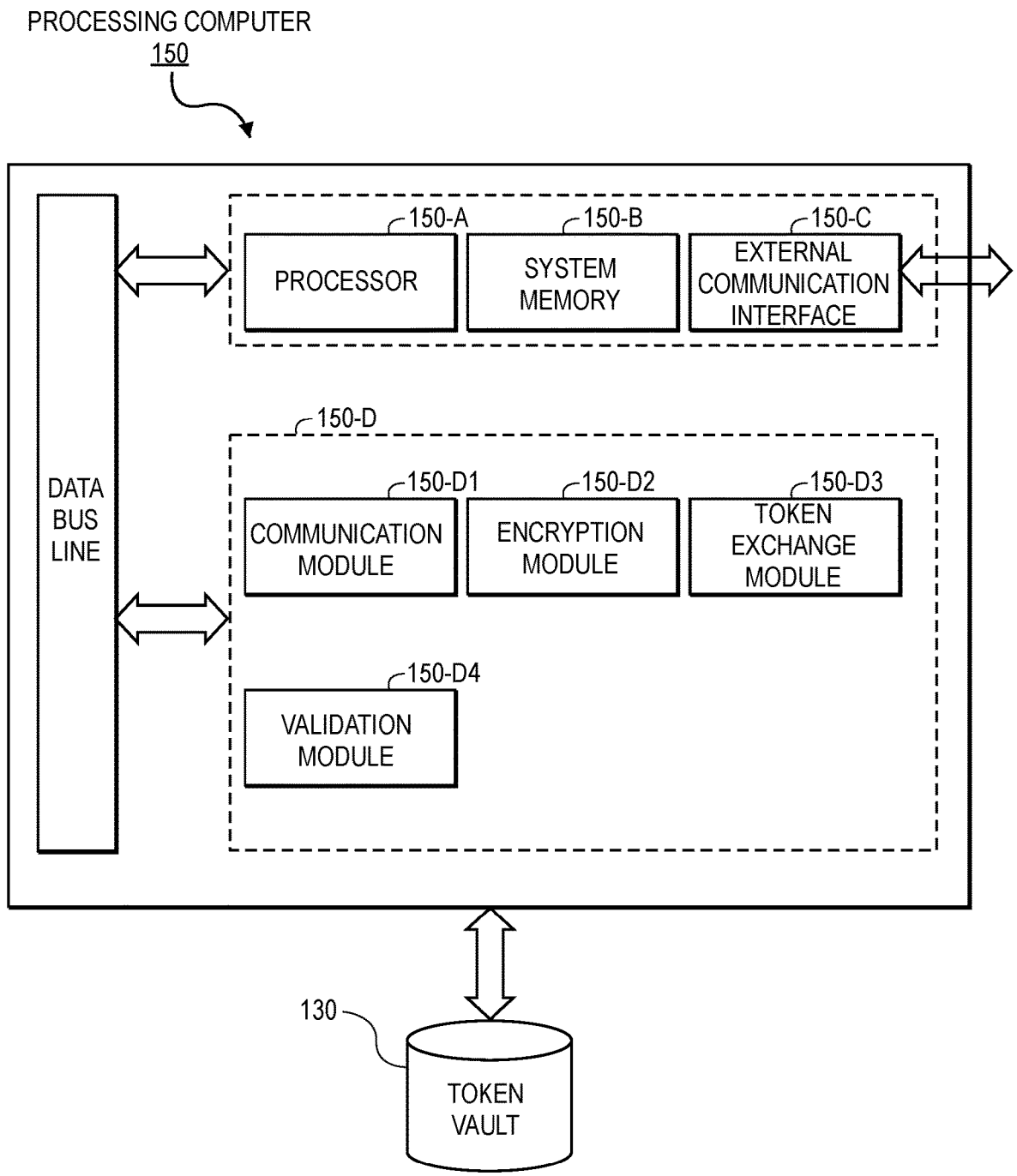
FIG. 5 shows a block diagram of a processing computer of a system according to an embodiment of the invention.

FIG. 5 shows a block diagram of a processing computer 150 of a system according to an embodiment of the invention. FIG. 5 shows a processing computer 150 and the token vault 130 coupled to the processing computer 150. It should be understood that, in some embodiments, the processing computer 150 and the token provider computer 104 may be housed within the unit and/or be affiliated with the same token provisioning system.

The processing computer 150 may comprise a processor 150-A, which may be coupled to a system memory 150-B and an external communication interface 150-C. A computer readable medium 150-D may also be operatively coupled to the processor 150-A.

The computer readable medium 150-D may comprise a number of software modules including a communication module 150-D1, an encryption module 150-D2, a token exchange module 150-D3, a validation module 150-D4.

The communication module 150-D1 may comprise code that causes the processor 150-A to generate messages, forward messages, reformat messages, and/or otherwise communicate with other entities.

The encryption module 150-D2 may comprise code that includes any suitable encryption algorithms to encrypt data in embodiments of the invention. Suitable data encryption algorithms may include DES, tripe DES, AES, etc. It may also store encryption keys that can be used with such encryption algorithms. The encryption module 150-D2 may utilize symmetric or asymmetric encryption techniques to encrypt and/or verify data.

The token exchange module 150-D3 may comprise code that causes the processor 150-A to retrieve an identifier based on receiving a token (or vice versa). For example, in some embodiments, upon receiving a token within an authorization request message (e.g., from a token requestor computer 102), the token exchange module 150-D3 may retrieve an intermediate access identifier from the token vault 130. The intermediate access identifier may have been previously stored in the token vault 130 by the token provider computer 104 during a token provisioning process, whereby the token was mapped to the intermediate access identifier. Upon retrieving the identifier, the token exchange module 150-D3 may transmit the identifier to another entity. For example, token exchange module 150-D3 may modify the authorization request message to include the intermediate access identifier and then transmit the modified message to another entity (e.g., the first authorization computer 106) for further processing.

The validation module 150-D4 may comprise code that causes the processor 150-A to validate authorization request messages to proceed with a transaction based on a token received as input. For example, validation module 150-D4 may contain logic that causes the processor 104-A to validate an authorization request message by decrypting a cryptogram included within the message, confirming that the token included within the message is authentic (e.g., associated with the requesting device), and/or by assessing risk associated with the requesting device. The validation module 150-D4 may also verify that the token attributes (e.g., a user identifier, token requestor identifier, token expiration date, frequency of use, etc.) conform to a set of predetermined rules. The predetermined rules may be determined by an entity (e.g., issuer bank) that has a trusted relationship with the processing computer 150.

Figure 6:
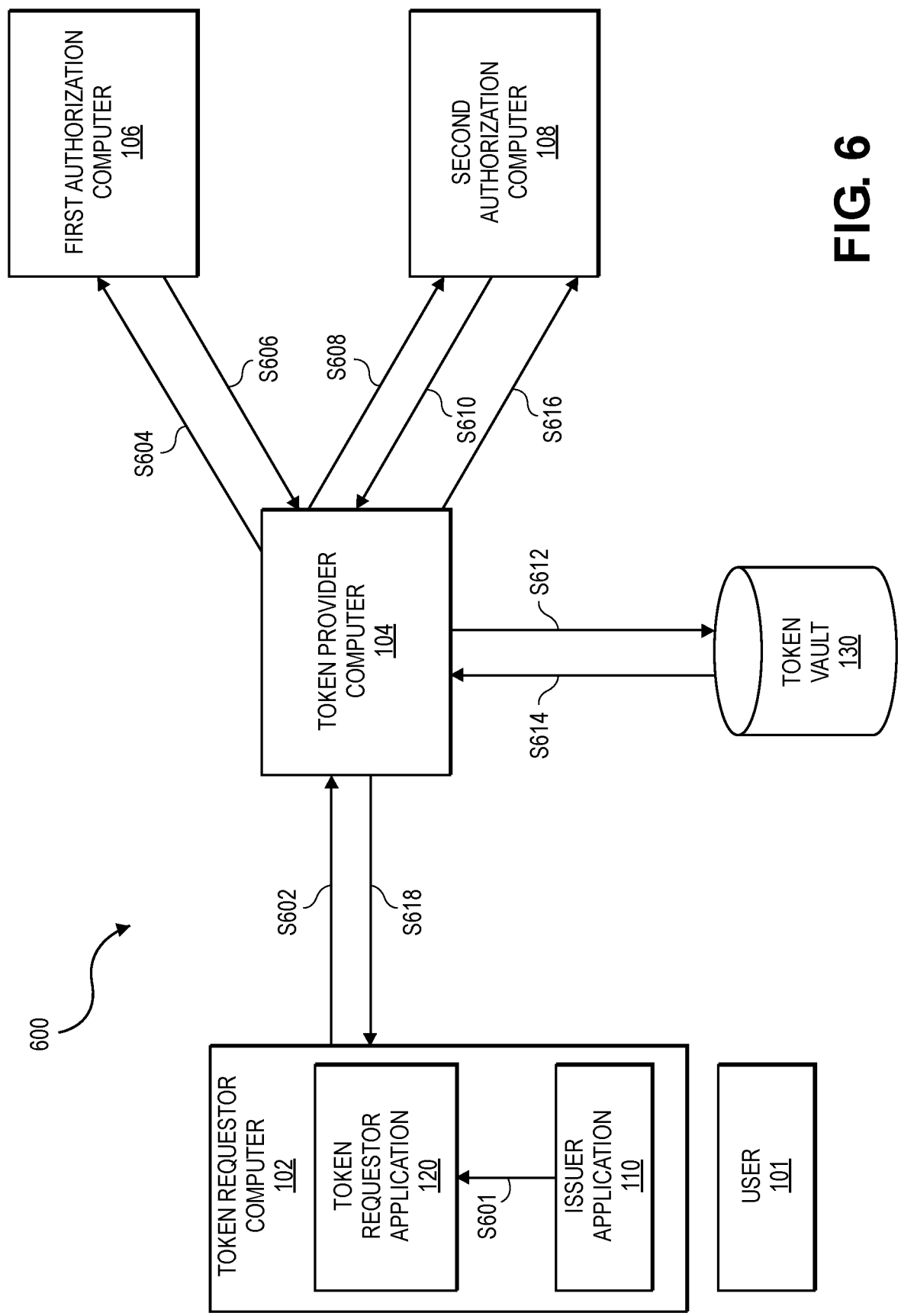
FIG. 6 shows a block diagram of a system and a flow sequence illustrating a first provisioning process using push provisioning according to an embodiment of the invention.
Figure 7:
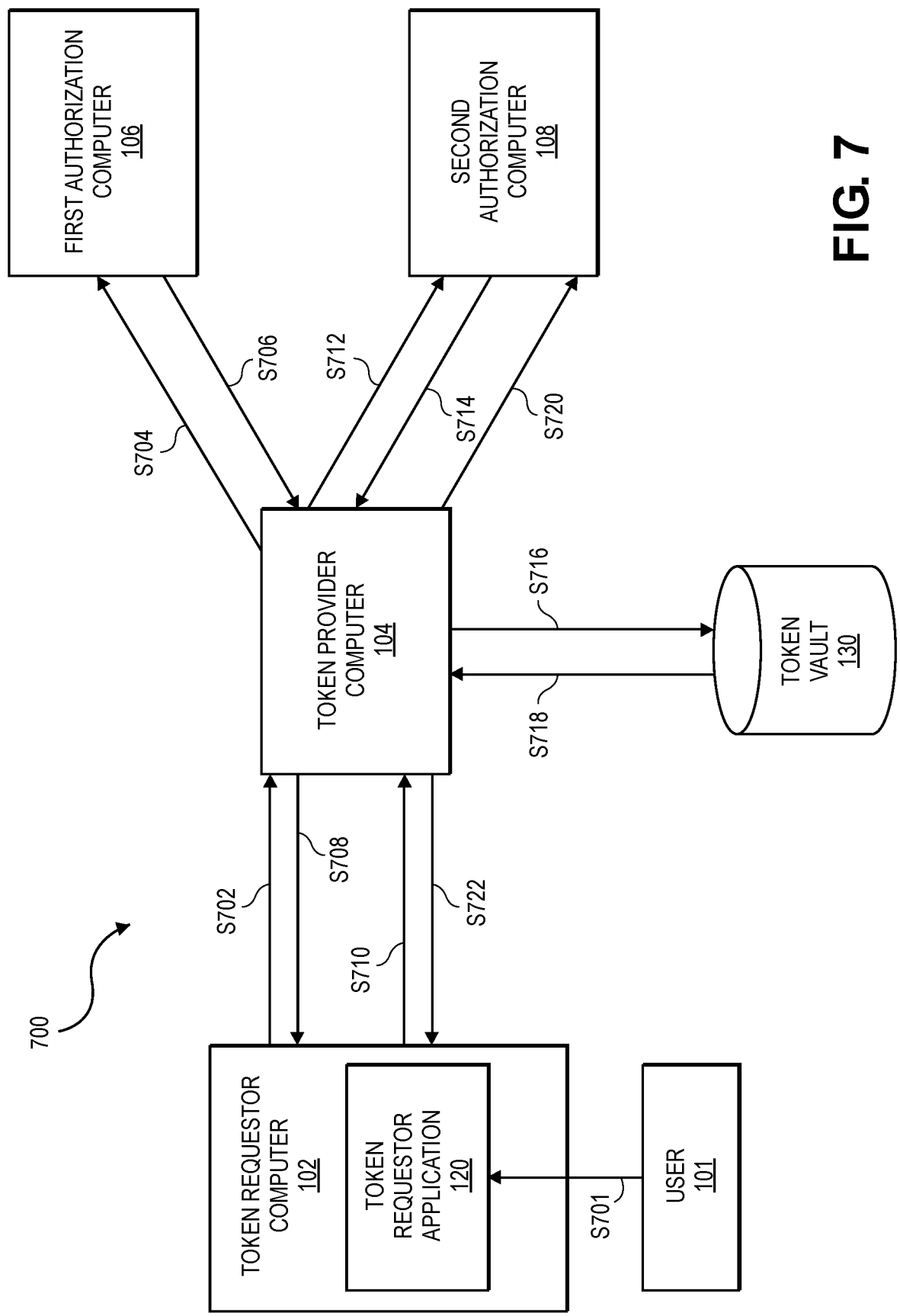
FIG. 7 shows a block diagram of a system and a flow sequence illustrating a second provisioning process using manual provisioning according to an embodiment of the invention.

FIGS. 6 and 7, respectively, show a block diagram of a system and a flow sequence illustrating different options for provisioning a token to a device according to embodiments of the invention: a first "push" provisioning process and a second "manual" provisioning process. In the "push" provisioning process of FIG. 6, an issuer application 110 (e.g., an banking application) may provide a user ID (e.g., a customer ID) and an initial access identifier (e.g., an IBAN) to a token requestor application 120 ("token requestor") (e.g., a digital wallet). The token requestor 120 may then initiate a provisioning process with a token provider computer 104. In the "manual" provisioning process of FIG. 7, a user may provide a user ID and an initial access identifier directly to a token requestor 120. The token requestor 120 may then initiate a provisioning process with a token provider computer 104.

Turning to FIG. 6 in further detail, a block diagram 600 of a system and a flow sequence illustrating a "push" provisioning process is illustrated. FIG. 6 shows a token requestor computer 102 that may request a token from a token provider computer 104. In some embodiments, the token requestor computer 102 may be a mobile communication device (e.g., a mobile phone). Also, although FIG. 6 depicts the issuer application 110 and the token requestor application 120 as being on the same device, embodiments of the invention should not be construed to be so limiting. In any case, under the "push" provisioning method, the issuer application 110 may be in communication with the token requestor 120. The token provider computer 104 may be associated with (e.g., contain or communicate with) a token vault 130. The token vault 130 may be a database that stores tokens with their associated real credentials or intermediate access identifiers. The token provider computer 104 may be in communication with a first authorization computer 106 and a second authorization computer 108.

In the illustrated flow, in step S601, a user with a mobile communication device 102 may log in to the issuer application 110. In some embodiments, the issuer application 110 may correspond to a banking account issued by a bank. The bank may provide the user with one or more payment credentials that may be associated with the banking account and may be stored on the mobile communication device 102 by the issuer application 110. In some embodiments, the payment credentials may include multiple elements such as a user identifier (e.g., user name, user email address, user phone number, etc.), account number (e.g., PAN), expiration date, CVV2 value, etc. However, in some embodiments, the payment credentials may include less elements. For example, the payment credentials provided to the user and/or issuer application may include only an account number and a user identifier. In yet other embodiments, the payment credentials may include only an account number, for example, in a case where the account may be shared by multiple users. In this case, when the user 101 logs into the issuer application (e.g., by inputting the account number and a password), the user 101 may be dynamically provided with a user identifier by the bank. In some embodiments, the account number may be an IBAN, which may have a different format than a PAN. For example, the IBAN may contain an alphanumeric string characters (e.g., "DE89 3704 0044 0532 0130 00"), whereas a PAN may be only numeric characters (e.g., "1234 5678 8765 4321"). In some embodiments, the bank may also issue a payment card (e.g., debit card) that may be associated with the account and may having printed on the card one or more payment credentials (e.g., user name, account number, etc.).

In the flow sequence discussed below in reference to FIG. 6, the payment credentials stored by the issuer application 110 on the mobile communication device may include an account number that is an IBAN, which may correspond to an initial access identifier. The payment credentials also may include a user identifier that is either generated in advance of the user 101 logging in, or at the time the user logs in. Although, as discussed below, the user identifier is a separate data element from the initial access identifier, embodiments of the invention should not be construed to be so limiting. For example, in some embodiments, the initial access identifier may include multiple fields, including a user identifier. It should be noted that, in the example of FIG. 6, the payment credentials stored on the mobile communication device 102 (and/or printed on the payment card issued to the user 101) may not include certain fields, for example, a CVV2 value.

Continuing with step S601, the issuer application 110 may prompt the user 101 to select a particular application to be provisioned with a token. The user 101 may then select the token requestor application 120, which may be a digital wallet in this example. Upon selecting the token requestor 120, the issuer application 110 may encrypt a payload containing the initial access identifier and the user identifier, and transmit the payload to the token requestor 120.

In step S602, the token requestor 120 may transmit a token request message to be received by a token provider computer 104. The token request message may contain the initial access identifier and the user identifier to enroll the initial access identifier with the token provider computer 104. In some embodiments, the token requestor 120 may first decrypt the payload from the issuer application 110 to obtain the initial access identifier and the user identifier. In some embodiments, the token requestor 120 may include other information within the token request message, including for example, a token requestor identifier (e.g. mobile device 102 identifier, digital wallet provider identifier, token domain, etc.). In some embodiments, the token request message may be encrypted.

In step S604, the token provider computer 104 may then transmit the user identifier and the initial access identifier to the first authorization computer 106, for example, by invoking the enrollment facilitation module 104-D5. Prior to transmitting the user identifier and the initial access identifier, the token provider computer 104 may first decrypt and/or validate the token request message received by the token requestor 120. For example, the token provider computer 104 may invoke the validation module 104-D4 to validate a cryptogram from the token requestor 120 to authenticate the token requestor 120 and assess a level of risk with the request. In some embodiments, if the validation module 104-D4 determines that the initial access identifier and/or device 102 is not eligible, the token provider computer 104 may return an error to the token requestor 120.

Upon receiving the user identifier and the initial access identifier, the first authorization computer 106 may then obtain (e.g., generate or retrieve from an existing pool) an intermediate account identifier, for example, by invoking the identifier conversion module 106-D3. In some embodiments, the first authorization computer 106 may first invoke the validation module 104-D4 to verify that the initial access identifier is eligible, and if not, may return an error to the token provider computer 104. In some embodiments, assuming the validation is successful, the obtained intermediate account identifier may correspond to an account identifier that is a different format (e.g., different fields and/or field formats) than the initial access identifier (e.g., a virtual PAN). More specifically, the intermediate account identifier may be a virtual debit card number, and it may have an expiration date and CVV2 value associated with it (e.g., in contrast with the initial access identifier, which may be an IBAN that does not have an associated CVV2 value). In some embodiments, the intermediate account identifier may be associated with an expiration date that is independent of an expiration date of the initial access identifier. In other embodiments, the expiration date may be the same expiration date as the initial access identifier (or derived from an expiration date of the initial access identifier using any suitable means). Upon generating the intermediate account identifier, the first authorization computer 106 may further invoke the identifier conversion module 106-D3 to store a mapping of the initial access identifier (and associated fields, e.g., the user identifier) and the intermediate access identifier (and associated fields, e.g., the expiration date) in a records database.

In some embodiments, the intermediate account identifier may be incapable of being used to directly conduct access transactions, but may be a conduit for provisioning a token to the communication device 102 and facilitating token-based transactions. For example, in some embodiments, the intermediate account identifier may be incapable of being used by a person to conduct a payment transaction. However, in other embodiments and as discussed below, the intermediate account identifier may be capable of being used to conduct a transaction, for example, at an e-commerce website.

In step S606, the first authorization computer 106 may transmit the intermediate access identifier to the token provider computer 104. In some embodiments, the first authorization computer 106 may also transmit an expiration date associated with the intermediate access identifier to the token provider computer 104.

In some embodiments, upon receiving the intermediate access identifier and expiration date from the first authorization computer 106, the token provider computer 104 may optionally conduct a message exchange process with the token requestor 120 (not shown in FIG. 6, but depicted in FIG. 7 steps S708 and S710). As depicted in FIG. 6, the token provider computer 104 does not send an enrollment confirmation message to the token requestor application 120 and instead automatically proceeds with continuing the enrollment process, as described below.

In step S608, based at least in part on receiving the intermediate access identifier in step S606, token provider computer 104 may transmit a token activation request message to the second authorization computer 108. In some embodiments, the token activation request message may include at least the initial access identifier. In some embodiments, any suitable information may be included in the message to enable the second authorization computer 108 to validate the token activation request message, including, but not limited to, the initial access identifier and/or the user identifier. In some embodiments, the second authorization computer 108 may utilize the initial access identifier to query the user 101 of the token requestor computer 102 and authenticate the user if desired using an ID&V process (e.g., with a one-time password or OTP).

In step S610, the second authorization computer 108 may respond with a token activation response message that is received by the token provider computer 104. The token activation response message may indicate whether the token activation request was approved (e.g., authorized) or denied.

In steps S612 and S614, assuming that the second authorization computer 108 agreed to provide the token to the token requestor 120, the token provider computer 104 may retrieve a token from the token vault 130, which may have been previously stored by the token provisioning module 104-D3. As described above, the mapping between the token and the intermediate access identifier may also be stored in the token vault 130 along with the associated token.

In step S616, the token provider computer 104 may provide (e.g., transmit) a token activation notification to the second authorization computer 108.

In step S618, the token provider computer 104 may provide (provision) the token to the token requestor 120. The token requestor 120 may store the token in a memory such as a secure memory 120C of the token requestor computer 102. The token may be permanent semi-permanent, or dynamic.

FIG. 7 shows a block diagram 700 of a system and a flow sequence illustrating a second provisioning process using manual provisioning according to an embodiment of the invention. Similar to as depicted in FIG. 6, FIG. 7 shows a token requestor computer 102 that may request a token from a token provider computer 104. In some embodiments, the token requestor computer 102 may be a mobile communication device (e.g., a mobile phone). However, in contrast with FIG. 6, a token requestor application 120 ("token requestor") (e.g., a digital wallet) on the token provider computer 104 may be configured to receive input directly from the user 101 to initiate the provisioning process, instead of having an issuer application that pushes the initiation request and payload to the token requestor. Similar to FIG. 6, the token requestor 120 may be in communication with the token provider computer 104. The token provider computer 104 may be associated with (e.g., contain or communicate with) a token vault 130. The token vault 130 may be a database that stores tokens with their associated real credentials or intermediate access identifiers. The token provider computer 104 may be in communication with a first authorization computer 106 and a second authorization computer 108.

In the illustrated flow, in step S701 the token requestor 120 may receive input from the user 101 to initiate the provisioning process. For example, the user 101 may input via an input element 102-E (e.g., keyboard) credentials such as an IBAN and a user identifier (e.g., email address, user name, etc.). The token requestor 120 may receive the credentials using any suitable method. The credentials entered may be similar to the credentials that are encrypted within the payload that is transmitted from the issuer application 110 to the token requestor 120 in FIG. 6.

Steps S702-S706, respectively, may be substantially the same as steps S602-S606 of FIG. 6. The descriptions thereof are incorporated herein and need not be repeated.

In step S708, as described earlier as an optional step in reference to FIG. 6, the token provider computer 104 may send an enrollment confirmation message to the token requestor 120. In some embodiments, upon receiving the enrollment confirmation message, the token requestor 120 may prompt the user 101 to agree to terms and conditions of token provisioning. In some embodiments, the enrollment confirmation message sent to the token requestor 120 may contain the intermediate access identifier and expiration date, which may be stored on the token requestor computer 102 and presentable to the user 101. This may be done, for example, in the case where an issuer enables a user 101 to conduct transactions directly via the intermediate access identifier. However, in other embodiments, the intermediate access identifier is completely hidden from the user 101 (e.g., managed between the token provider computer 104 and the first authorization computer). In some embodiments, the enrollment confirmation message may also contain a reference number that is associated with the token enrollment session, which the token requestor 120 may return back to the token provider computer 104 to proceed with the enrollment process, as discussed in step S710, below.

In step S710, upon the user 101 agreeing to the terms and conditions and/or selecting other provisioning options presented by the token requestor 120, the token requestor 120 may transmit an enrollment confirmation reply message to the token provider computer 104 that contains the reference number and other suitable information, indicating that the user 101 will continue with the provisioning process. The token provider computer 104, upon receiving the reference number back from the token requestor computer 102, may use the reference number to look up and retrieve information from the token vault to proceed with the enrollment process (e.g., the initial access identifier, user identifier, etc.).

Steps S712-S722, respectively, may be substantially the same as steps S608-S618 of FIG. 6. The descriptions thereof are incorporated herein and need not be repeated.

Figure 8:
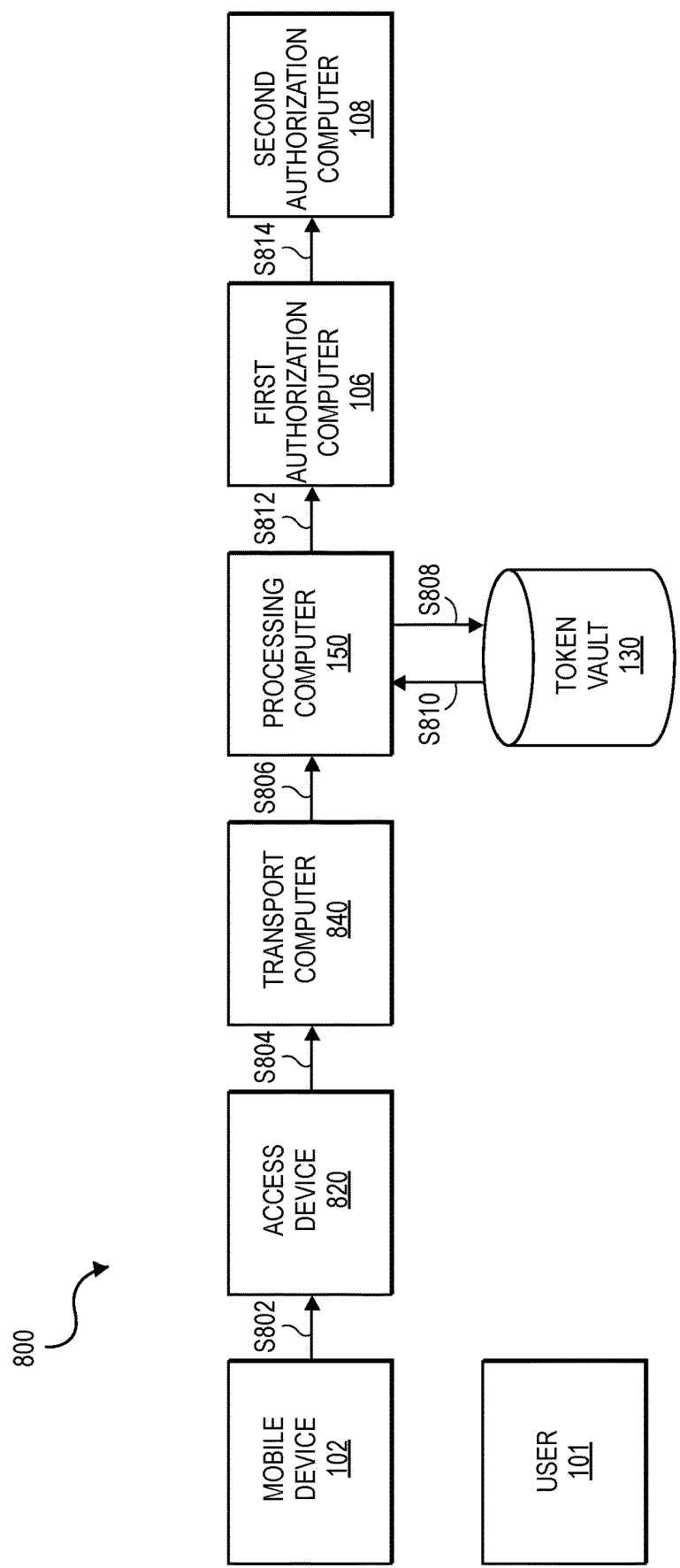
FIG. 8 shows block diagram of a system and a flow sequence illustrating use of a token according to an embodiment of the invention.

FIG. 8 shows block diagram 800 of a system and a flow sequence illustrating use of a token after it has been provisioned to a user's communication device, according to an embodiment of the invention. FIG. 8 shows a system including a communication device 102 of a user 101, an access device 820 (e.g., POS terminal), a transport computer 840 (e.g., an acquirer computer), a processing computer 150 (e.g., in a payment processing network such as VisaNet), a first authorization computer 106, and a second authorization computer 108, all in communication with each other. A token vault 130 may be in communication with the processing computer 150.

Prior to step S802, the communication device 102 may be provisioned with a token as described above in reference to FIGS. 6 and 7. In step S802, the communication device 102 can interact with the access device 820 according to any suitable token presentment mode (e.g., NFC communication). In other embodiments, for example an e-commerce transaction, the communication device 102 may submit the token over the Internet to a website associated with the access device 820. In the process, the access device 820 may receive other associated with the token information (e.g., a token expiration date, other token attributes).

In step S804, an authorization request message comprising the token may be generated by the access device 820, and then transmitted to the transport computer 840.

In step S806, the transport computer 840 may transmit the authorization request message including the token to be received by the processing computer 150. The processing server computer 150 may be in a payment processing network. The payment processing network may include data processing subsystems, networks, and operations used to support and deliver authorization services, exception file services, and clearing and settlement services. An exemplary payment processing network may include VisaNet™' Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network may use any suitable wired or wireless network, including the Internet.

In step S808, the processing computer 150 may validate the authorization request message by executing the validation module 150-D4. Upon a successful validation, the processing computer 150 may invoke the token exchange module 150-D3, which may provide the token to the token vault 130 (e.g., via the token provider computer 104).

In step S810, the token exchange module 150-D3 may, in turn, retrieve (e.g., receive) the intermediate access identifier associated with the token from the token vault 130.

In step S812, the processing computer 150 may provide (e.g., transmit) the intermediate access identifier to the first authorization computer 106. In some embodiments, the token exchange module 150-D3 may modify the authorization request message to include the intermediate access identifier and then transmit the modified authorization request message to the first authorization computer 106 for further processing.

In step S814, the first authorization computer 106 may retrieve the initial access identifier based on the intermediate access identifier received from the processing computer 150. In some embodiments, the first authorization computer 106 may execute the authorization request translation module 106-D5 to translate (e.g., replace, or additionally include) the intermediate access identifier with the initial access identifier in the modified authorization request message. The first authorization computer 106 may then transmit the modified message including the initial access identifier to the second authorization computer 108 for authorizing the transaction.

If approved (e.g., authorized), the second authorization computer 108 may transmit an authorization response message back to the access device 820 via the transport computer 840, the processing computer 150, and the first authorization computer 106 (step sequence not shown in FIG. 8). In some embodiments, the authorization response message may be routed back to the access device 820 based on the initial access identifier, the intermediate access identifier, and/or the token. For example, upon the first authorization computer 106 receiving the authorization response message containing the initial access identifier, the first authorization computer 240 may switch the initial access identifier for the intermediate access identifier, and then transmit the modified authorization response message to the processing computer 150. The processing computer 150 may, in turn, switch the intermediate access identifier for the token in the authorization response message (e.g., retrieving the token from the token vault 130 based on the mapping stored within the token vault 130). The processing computer 150 may then transmit the authorization response message to the transport computer 840 based on token attributes and other suitable information that was originally received in the authorization request message in step S806. The authorization response message may be similarly routed from the transport computer 840 to the access device 820 and/or mobile device 102.

In some embodiments, the second authorization computer 108, the first authorization computer 106, the processing computer 150, and the transport computer 840 may perform a settlement process to settle the transaction.

Figure 9:
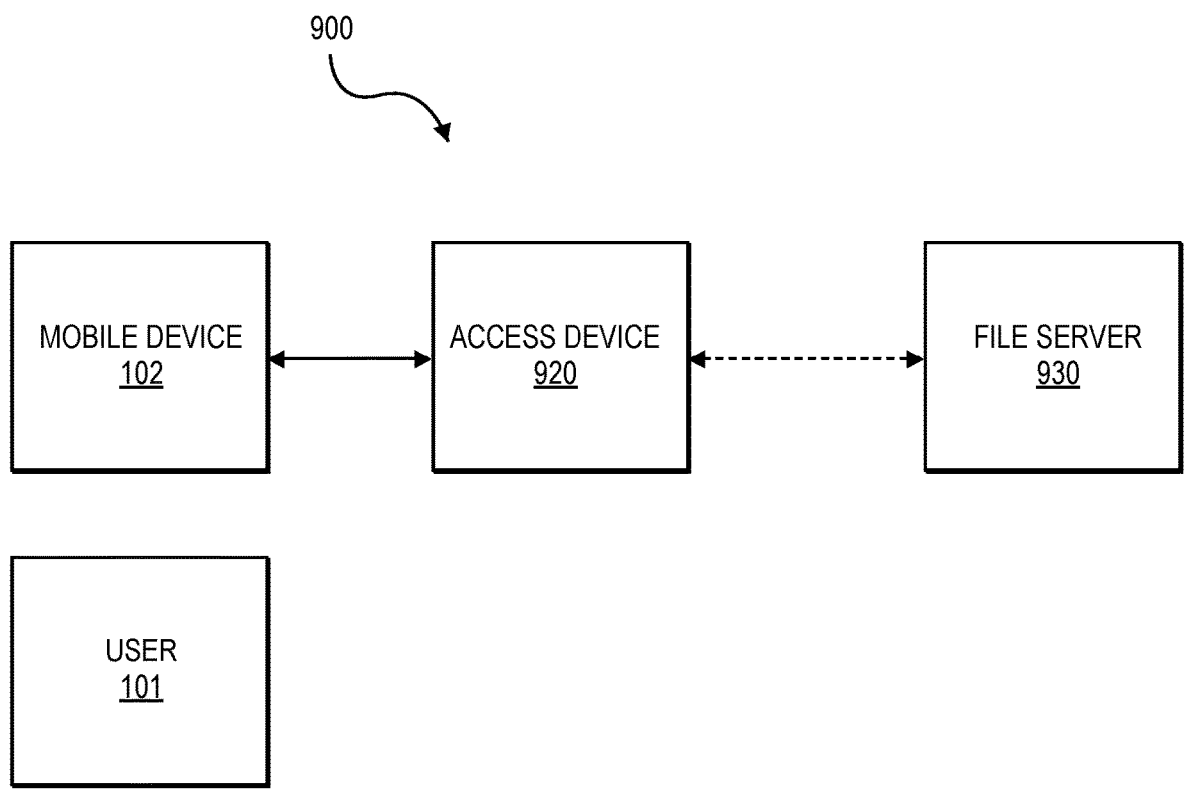
FIG. 9 shows a block diagram of a system illustrating use of a token according to an embodiment of the invention.

FIG. 9 shows a block diagram 900 of a system illustrating use of a token according to an embodiment of the invention. FIG. 9 shows a system including a communication device 102 of a user 101, an access device 920 (e.g., a gateway server), and a cloud services file server 930. The access device 920 may be in further communication with other intermediary computers between the access device 920 and the file server 930 (not shown), similar to as depicted in FIG. 8 (e.g., a processing computer 150, first authorization computer 106, second authorization computer 150, token vault 130).

In FIG. 9, the mobile device 102 may be provisioned with a token as described above in reference to FIGS. 6 and 7. The mobile device 102 may interact with the access device 920 according to any suitable token presentment mode (e.g., over the Internet). In the process, the access device 920 may receive the token and other information (e.g., an expiration date). The access device 920 may then proceed with a series of steps to request authorization, on behalf of the user 101, to access a remote file on the file server 920. In some embodiments, the steps may be substantially similar to steps S804-S814 of FIG. 8.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A first authorization computer comprising:
   a processor; and
   a non-transitory computer readable medium coupled to the processor, the computer readable medium comprising code, executable by the processor, for implementing a method comprising:
   receiving an initial access identifier from a token provider computer;
   obtaining an intermediate access identifier based at least in part on the initial access identifier; and
   transmitting the intermediate access identifier to the token provider computer, wherein the token provider computer transmits a token activation request message, based at least in part on the intermediate access identifier, to a second authorization computer to authorize a token to be provisioned to a token requestor computer.

2. The first authorization computer of claim 1, wherein the initial access identifier comprises an alphanumeric value that corresponds to an account identifier of an account.

3. The first authorization computer of claim 2, wherein receiving the initial access identifier further comprises receiving a user identifier of an authorized user that is associated with the account.

4. The first authorization computer of claim 3, wherein obtaining the intermediate access identifier comprises generating a virtual primary account number that is associated with the authorized user and the account.

5. A method comprising:
receiving, by a processing computer, an authorization request message comprising a token;
providing, by the processing computer, the token to a token provider computer in a transaction;
receiving, by the processing computer, an intermediate access identifier associated with the token;
modifying, by the processing computer, the authorization request message to include the intermediate access identifier; and
transmitting, by the processing computer, the authorization request message including the intermediate access identifier to a first authorization computer, wherein the first authorization computer modifies the authorization request message to include an initial access identifier associated with the intermediate access identifier, and transmits the authorization request message with the initial access identifier to a second authorization computer to authorize the transaction.

6. The method of claim 5, wherein the initial access identifier comprises an alphanumeric value that corresponds to an identifier for a resource.

7. The method of claim 6, wherein the resource corresponds to a file on a remote file server.

8. The method of claim 5, wherein the intermediate access identifier is a virtual resource identifier.

9. The method of claim 8, wherein the virtual resource identifier is not operable for being used to directly conduct a transaction.

10. The method of claim 5, wherein the intermediate access identifier is associated with an expiration date.

11. The method of claim 5, the method further comprising:
subsequent to the second authorization computer authorizing the transaction, receiving, by the processing computer, an authorization response message from the first authorization computer, the authorization response message including the intermediate access identifier, the first authorization computer having replaced the initial access identifier included in an original authorization response message received from the second authorizing computer with the intermediate access identifier;
retrieving, by the processing computer, the token from the token provider computer based at least in part on the intermediate access identifier;
including, by the processing computer, the token in a modified authorization response message; and
transmitting, by the processing computer, the modified authorization response message to an access device.

12. The method of claim 5, wherein the intermediate access identifier is received from the token provider computer, the token provider computer maintaining a mapping of the token to the intermediate access identifier.

13. A processing computer comprising:
a processor; and
a non-transitory computer readable medium coupled to the processor, the computer readable medium comprising code, executable by the processor, for implementing a method comprising:
receiving an authorization request message comprising a token;
providing the token to a token provider computer in a transaction;
receiving an intermediate access identifier associated with the token;
modifying the authorization request message to include the intermediate access identifier; and
transmitting the authorization request message including the intermediate access identifier to a first authorization computer, wherein the first authorization computer modifies the authorization request message to include an initial access identifier associated with the intermediate access identifier, and transmits the authorization request message with the initial access identifier to a second authorization computer to authorize the transaction.

14. The processing computer of claim 13, wherein the initial access identifier is comprises an alphanumeric value that corresponds to an identifier for a resource.

15. The processing computer of claim 14, wherein the resource corresponds to a file on a remote file server.

16. The processing computer of claim 13, wherein the intermediate access identifier is a virtual resource identifier.

17. The processing computer of claim 16, wherein the virtual resource identifier is not operable for being used to directly conduct a transaction.

18. The processing computer of claim 13, wherein the intermediate access identifier is associated with an expiration date.

19. The processing computer of claim 13, wherein the method further comprises:
subsequent to the second authorizing computer authorizing the transaction, receiving, by the processing computer an authorization response message from the first authorization computer, the authorization response message including the intermediate access identifier, the first authorization computer having replaced the initial access identifier included in an original authorization response message received from the second authorizing computer with the intermediate access identifier;
retrieving, by the processing computer, the token from the token provider computer based at least in part on the intermediate access identifier;
including, by the processing computer, the token in a modified authorization response message; and
transmitting, by the processing computer, the modified authorization response message to an access device.

20. The processing computer of claim 13, wherein the intermediate access identifier is received from the token provider computer, the token provider computer maintaining a mapping of the token to the intermediate access identifier.

* * * * *